United States Patent
Elmegreen

(10) Patent No.: US 10,935,692 B2
(45) Date of Patent: *Mar. 2, 2021

(54) COMBINED CHEMICAL AND VELOCITY SENSORS FOR FLUID CONTAMINATION ANALYSIS

(71) Applicant: INTERNATIONAL BUSINESS MACHINES CORPORATION, Armonk, NY (US)

(72) Inventor: Bruce G. Elmegreen, Goldens Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,700

(22) Filed: Oct. 11, 2019

(65) Prior Publication Data

US 2020/0041690 A1    Feb. 6, 2020

Related U.S. Application Data

(63) Continuation of application No. 15/597,648, filed on May 17, 2017, now Pat. No. 10,502,862.

(51) Int. Cl.
| | | |
|---|---|---|
| *G01V 9/00* | (2006.01) | |
| *G06F 7/64* | (2006.01) | |
| *G01P 5/00* | (2006.01) | |

(52) U.S. Cl.
CPC ............ *G01V 9/00* (2013.01); *G01P 5/001* (2013.01); *G01V 9/007* (2013.01); *G06F 7/64* (2013.01)

(58) Field of Classification Search
CPC .......... G01P 5/001; G01V 9/00; G01V 9/007; G06F 7/64

USPC ....... 702/23, 94, 96, 104, 150, 158; 367/129
See application file for complete search history.

(56) References Cited

U.S. PATENT DOCUMENTS

| | | | |
|---|---|---|---|
| 6,895,335 B2 | 5/2005 | Archibald et al. | |
| 7,523,638 B2 | 4/2009 | Prince | |
| 7,834,754 B2 | 11/2010 | Kulesz et al. | |
| 8,838,271 B2 | 9/2014 | Ghose et al. | |
| 8,949,037 B2 | 2/2015 | Prince et al. | |
| 9,057,643 B2 | 6/2015 | Jones | |
| 9,366,192 B2 | 6/2016 | Byrd et al. | |
| 9,500,556 B2 | 11/2016 | Rella et al. | |
| 10,502,862 B2 * | 12/2019 | Elmegreen | G01V 9/007 |

(Continued)

FOREIGN PATENT DOCUMENTS

| | | |
|---|---|---|
| CA | 2381891 | 8/2010 |
| CN | 104931928 | 9/2015 |

OTHER PUBLICATIONS

List of IBM Patents or Patent Applications Treated as Related dated Oct. 11, 2019, 2 pages.

(Continued)

*Primary Examiner* — John H Le
(74) *Attorney, Agent, or Firm* — Tutunjian & Bitetto, P.C.; Anthony Curro

(57) ABSTRACT

Methods and systems for locating a chemical source include cross-correlating chemical concentration data from pairs of positions using a processor to determine an average velocity vector for a group of positions that averages away turbulence contributions. A convergence region is determined based on multiple average velocity vectors to determine a chemical source location.

20 Claims, 6 Drawing Sheets

(56) References Cited

U.S. PATENT DOCUMENTS

2012/0116681 A1    5/2012   Fuller et al.
2014/0092711 A1    4/2014   Bagratashvili
2017/0227509 A1    8/2017   Chang et al.

OTHER PUBLICATIONS

Li Wei, Localization of the Offshore Pollutant Source in Lakes Using Spatial-temporal Filtering, Proceedings of the 33rd Chinese Control Conference, Nanjing, China, Jul. 28-30, 2014.
International Search Report for PCT/IB2018/053345 dated Sep. 19, 2018 (9 pages).

\* cited by examiner

US 10,935,692 B2

COMBINED CHEMICAL AND VELOCITY SENSORS FOR FLUID CONTAMINATION ANALYSIS

BACKGROUND

Technical Field

The present invention generally relates to fluid velocity measurement and, more particularly, to tracking and localizing contaminant sources.

Description of the Related Art

A difficulty in locating the source of, e.g., a drifting chemical vapor or fluid is the increase in downstream flow irregularity due to turbulence. This irregularity means that an instantaneous chemical sensor will detect a time-varying concentration with both short-term and long-term changes.

SUMMARY

A method for locating a chemical source includes cross-correlating chemical concentration data from pairs of positions using a processor to determine an average velocity vector for a group of positions that averages away turbulence contributions. A convergence region is determined based on multiple average velocity vectors to determine a chemical source location.

A combined chemical and velocity sensor system includes a sensor control module comprising a processor configured to cross-correlate chemical concentration data from pairs of chemical concentration sensors and to determine an average velocity vector that averages away turbulence contributions to determine a chemical source location.

A chemical source location system includes multiple combined chemical and velocity sensor (CCVS) systems. Each CCVS system has a sensor control module comprising a processor configured to cross-correlate chemical concentration data from pairs of chemical concentration sensors and to determine an average velocity vector that averages away turbulence contributions. An analysis module comprising a processor is configured to determine a convergence region based on the plurality of average velocity vectors to determine a chemical source location.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide detection and localization of, e.g., chemical leaks from complex structures such as pipeline pads and buildings. These embodiments provide simultaneous and co-located measurements of chemical concentrations in the air, plus the directions and speeds of air currents. Detection of chemical leaks in a liquid, such as oil in water, make use of a similar combination of concentration measurements and fluid measurements.

In particular, the present embodiments make measurements of both chemical concentrations as well as local fluid directions and speeds at multiple different points in a space. The chemical concentration measurements are cross-correlated with one another to determine a direction of the chemical's flow. The combination of multiple such concentration/fluid sensors is referred to herein as a combined chemical and velocity sensor (CCVS).

Figure 1:
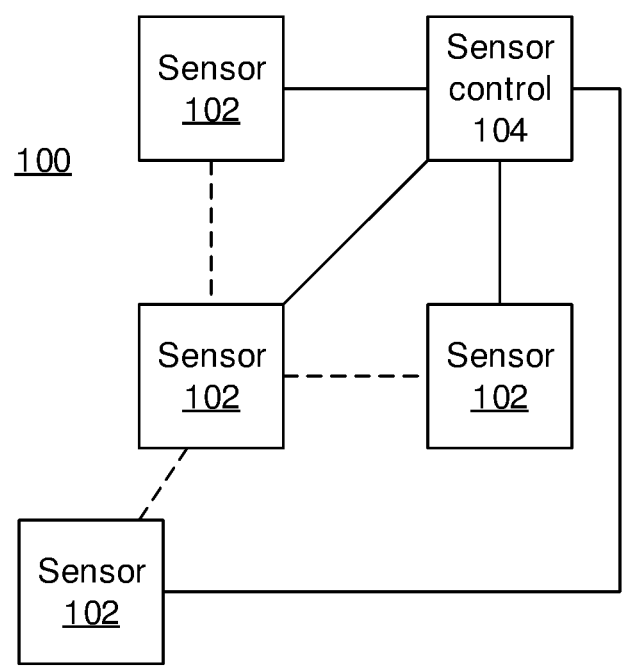
FIG. 1 is a block diagram of a combined chemical and velocity sensor (CCVS) that measures a direction of chemical or contaminant flow in accordance with an embodiment of the present invention.

Referring now to the drawings in which like numerals represent the same or similar elements and initially to FIG. 1, a CCVS 100 is shown. The CCVS 100 includes sensors 102 and a control module 104. The sensors 102 are each connected to the control module 104 and provide sensor data by, e.g., a wired or wireless connection. The control module 104 determines a direction from which a flow of chemical or contaminant comes.

Each sensor 102 measures concentration of a chemical or contaminant. The sensors 102 may measure these quantities in a gaseous environment or in a liquid environment. An instantaneous chemical fraction measured as a function of time from each sensor 102 in each CCVS 100 may be stored in a time sequence of several seconds or minutes in length, depending on the speed of the sensor 102 and the speed of the fluid past the sensor 102. Shorter time sequence lengths may be appropriate for faster sensors 102 and higher wind speeds. Trial time lags between two particular sensors 102 may be positive or negative, corresponding to a pattern of contaminant reaching one sensor 102 in the pair or the other first.

In one embodiment, a sensor 102 is positioned at the "origin" and additional sensors 102 are positioned along each of three orthogonal dimension axes. It should be understood that this arrangement of sensors is only one possible configuration. Any set of four or more sensors 102 that are not coplanar can be used to provide a direction for an arbitrary point in three-dimensional space. Alternative configurations include, e.g., a tetrahedral configuration where each sensor 102 is equidistant from each other sensor 102 in the CCVS 100. The present embodiments are described with particular attention to CCVS configurations that include four sensors, but it should be understood that additional sensors can be used.

In a CCVS 100 having four sensors 102, there are six combinations of sensor pairs that can be used for cross-correlation. Each pair has a different direction for the spatial vector connecting the sensors 102 and will, in general, have a different time lag between the measurement of fluid elements. If the four sensors 102 are at points $r_i$, where $i=(1,4)$, and if the lag between point i and point j is expressed as $\tau_{ij}$, then the average flow velocity at the average sensor position for three orthogonal directions is expressed as:

$$V_x = \frac{1}{6}\sum_{i,j} \frac{(r_i - r_j)_x}{\tau_{ij}}$$

$$V_y = \frac{1}{6}\sum_{i,j} \frac{(r_i - r_j)_y}{\tau_{ij}}$$

$$V_z = \frac{1}{6}\sum_{i,j} \frac{(r_i - r_j)_z}{\tau_{ij}}$$

where $\tau_{ij}$ is a time lag between points i and j and where $(.)_x$ designates the x-directional component of the positional vector between points i and j, with $(.)_y$ and $(.)_z$ being analogous for the y- and z-directional components. The quantities on the right-hand sides of these equations are summations over all pairs of sensors 102 positioned at $r_i$ and $r_j$. The factor of ⅙ takes the average velocity in the case of four sensors 102 (corresponding to six distinct pairs of sensors 102). In general, the number of pairs between an arbitrary number N of sensors 102 is the number of combinations of N taken two at a time, which is expressed as $N!/(2!(N-2)!)$.

In general the Fourier transform power spectrum of the time variation of fluid motion between sensors 102 is a power-law with a fixed slope, reflecting Komogorov scaling of subsonic turbulence. Associated with this time signal is a spatial distribution of the chemical contaminant, which is also multi-scale with the swirling pattern of incompressible turbulence. In such a flow, the measurement of concentration from a single sensor 102 varies with time as the peaks and valleys of the spatial distribution pass by. Both the spatial irregularity at any one time and the temporal irregularity at any one place are unpredictable in detail, but their statistical properties can be averaged over large regions and times and vary only slowly.

The time-dependent signal of the chemical contaminant at any one sensor 102 can be combined with the time-dependent signal of the contaminant at any other sensor 102 using cross-correlation to determine the most likely time lag for the drift of a spatial irregularity pattern from one sensor 102 to the other. This time lag, combined with the known spatial vector pointing from one sensor 102 to another, gives the average flow speed in that direction. For several pairs of sensors 102 and their pairwise cross-correlations and resulting lags, all three components of the average fluid velocity can be determined at the position given by the average position of the sensors 102. The average fluid velocity is the velocity averaged over the volume enclosed by the sensors 102 of the CCVS 100 over the time interval used for cross-correlation.

As an example, if the time-dependent signal at a first sensor 102 is designated $S_1(t)$ and the time-dependent signal at a second sensor 102 is designated as $S_2(t)$, then the time lag $\tau_{12}$ is determined, such that the cross-correlation product between two time limits, $t_a$, and $t_b$, is maximized. The cross-correlation product is defined herein as:

$$C_{t_a,t_b}(\tau) = \int_{t_a}^{t_b} S_1(t) S_2(t-\tau) dt$$

Thus the time sequences from each pair of sensors 102 in each CCVS 100 are multiplied together with a time lag of successively increasing lengths. These sequences should be synchronized, so that a pattern of chemical concentration has a chance of being contained in each sequence. The value of $\tau$ that maximizes the integral, defined as $\tau_{ij}$, can be found by trial and error with different values of $\tau$ using a numerical integration based on recent values of $S_1$ and $S_2$ as measured between $t_a$, and $t_b$. If one or more sensors 102 does not detect any contamination during the integrated time interval, then the lags for the corresponding pairs are undefined and that time interval is ignored for those sensors 102. The time lag between each pair of sensors 102 which gives the largest cross-correlation product for that pair of sensors 102 should be saved in a memory.

The known positional differences between pairs of sensors 102 in each CCVS 100 is divided by the corresponding optimal time lag for that pair. The averages of these ratios for all i and j in each vector component gives the average vector velocity in the chosen time interval. If a particular sensor 102 includes no signal of the chemical or contaminant in that time interval, then the average may still be possible from the other sensors 102 and a velocity may be determined. However, if a detection is made in only one or two of the sensors, then no detection of velocity is possible and that time interval may be removed from further analysis.

Smaller CCSVs 100 will produce more localized measurements of the fluid velocity. The sensors 102 should be capable of measuring fluctuations with a temporal resolution equal to half of the timescale at which a typically fast burst of fluid travels over the shortest distance of separation between two sensors 102. Alternatively, given the response time of a sensor to changes in the concentration of contaminants, the CCSV 100 should be larger than, or equal to, the distance that the fluid can travel in a time equal to twice the detector response time, allowing a margin that provides for fluid velocity excursions that are on the high end of a speed distribution. In both cases a factor of two provides optimum sampling at the Nyquist frequency.

The control module 104 thus performs the real-time cross-correlations described above, multiplying together the signals from each pair of sensors 102 with a time lag between each pair that maximizes the cross-correlation product. When dividing time lags into the spatial vector separating two sensors 102 the result is a measurement of fluid velocity averaged over the space occupied by the sensors 102 and averaged over the time window of the cross-correlation product.

In some embodiments, the CCVS 100 may be part of a permanent or fixed installation, where the CCVS 100 is stationary with respect to the chemical or contaminant source. In other embodiments, the CCVS 100 may be in motion with respect to the chemical or contaminant source, for example implemented on a mobile platform, truck, or drone aircraft. The difference between the velocity detected by the CCVS 100 and the ground-based velocity represents the measured fluid velocity.

Figure 2:
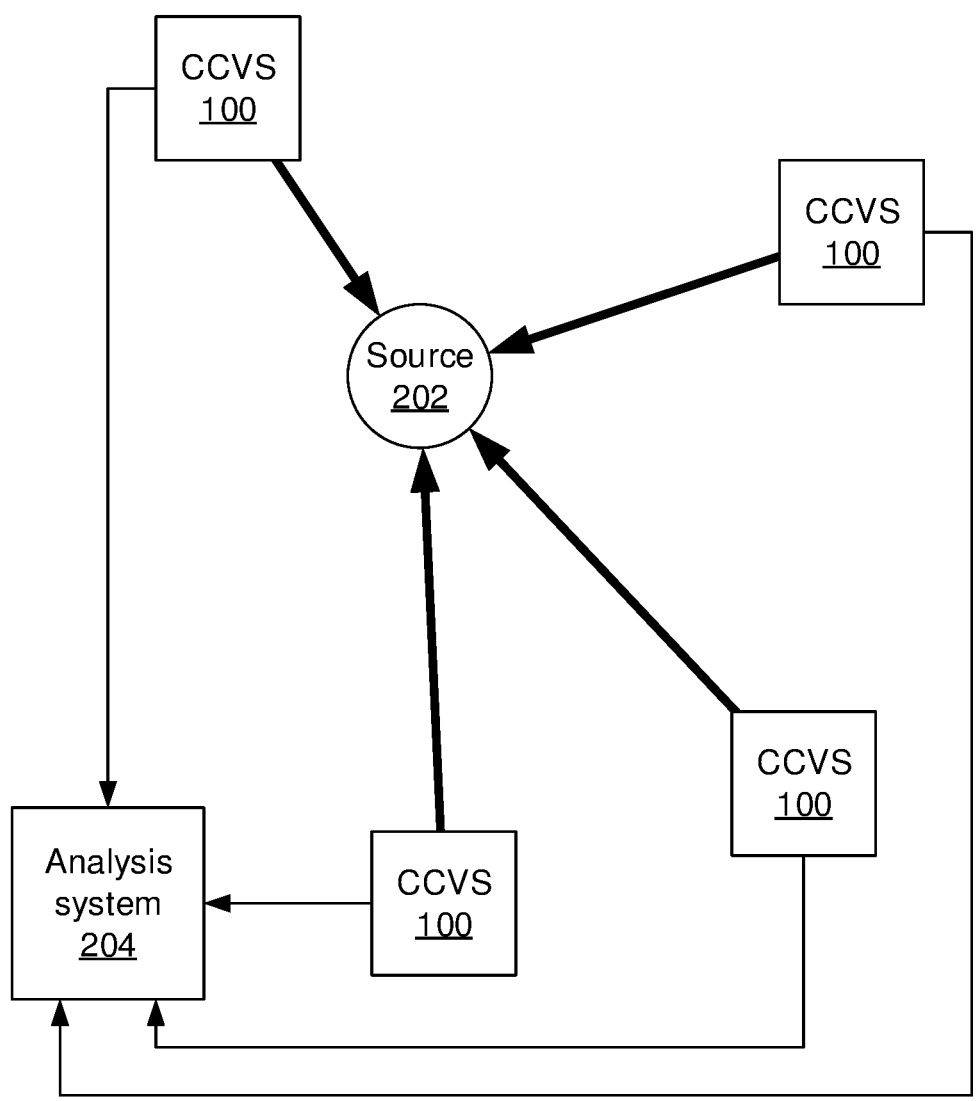
FIG. 2 is a block diagram of multiple CCVS systems in an arrangement configured to localize a source of a chemical or contaminant in accordance with an embodiment of the present invention.

Referring now to FIG. 2, an arrangement of multiple CCVSs 100 is used to determine the source 202 of a chemical or contaminant. A property of turbulent flow predicts that the long-term average of the fluid velocities measured by the sensors 102 in a given CCVS 100 corresponds to the fluid velocity averaged over a large spatial scale around the CCVS 100. Thus, the long-time average direction of the fluid measured at a single CCVS 100 points back to the source of the chemical or contamination, within some margin of error that decreases as the averaging time increases. The CCVSs 100 provide their measurements of the time-averaged vectors of fluid movement to an analysis system 204.

Each CCVS 100 thus points to the source 202 of contamination, which means that a combination of four CCVSs 100 can point to a single unique position in three-dimensional space. Two CCVSs 100 are enough to give the three-dimensional position of the source 202 if the direction to the source 202 is not co-aligned with the vector connecting the two CCVSs 100. Three CCVSs 100 are sufficient to detect the source 202 if the position is not co-aligned with the plane of the three CCVSs 100. Four non-coplanar CCVSs 100 are sufficient to detect the source 202 in the general case, with any orientation of the four CCVSs 100 being suitable to detect the source 202.

FIG. 2 thus represents one specific configuration of CCVSs 100 to detect a source 202 that is located within a perimeter established by the CCVSs 100. The present embodiments are also able to locate the source 202 if the source 202 is positioned outside such a perimeter. If the vectors from all of the CCVSs 100 point back to a large volume of space or to several small volumes instead of a single, small volume, then it can be concluded that the source 202 covers a wide region or there is more than one source 202.

The CCVSs 100 should be positioned close enough to the source 202 to give a reasonable expectation that the sensors 102 inside each CCVS 100 will detect the leak at least some of the time. If the area in which the source 202 may be located is large, then many CCVSs 100 should be placed in that area, with at least some of the CCVSs 100 outside of the suspected area, to provide sufficient directional accuracy in the final position determination.

In general the wind direction and speed will change from hour to hour and day to day, so the detection of chemicals or contaminants by a particular CCVS 100 will be intermittent. Each velocity vector detection should be saved and averaged together for a long time (e.g., over days or weeks) to give the average velocity when a contaminant is detected by that CCVS 100. The vector in the direction opposite to the long-term average velocity points to the source 202. With multiple CCVSs 100 and their respective long-term average velocities, the three-dimensional position of the source 202 will be in the vicinity of the intersection point of all of the directions, measured as being opposite to the long-term average CCVS velocities.

Figure 3:
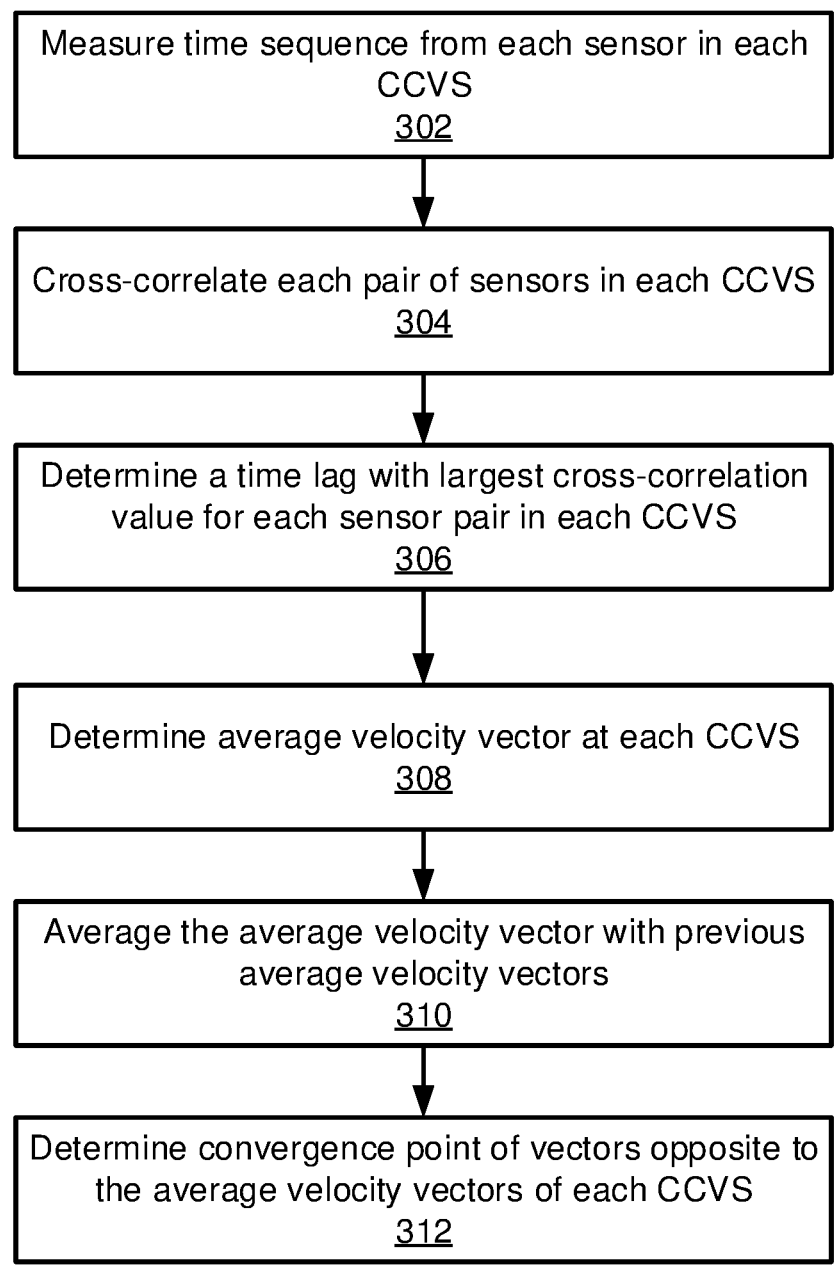
FIG. 3 is a block/flow diagram of a method for localizing a source of a chemical or contaminant in accordance with an embodiment of the present invention.

Referring now to FIG. 3, a method of locating a chemical or contaminant source 202 is shown. Block 302 measures a time sequence of chemical concentration and fluid velocity at each sensor 102 in each CCVS 100. Block 304 cross-correlates each pair of sensors 102 in each CCVS 100 and block 306 uses these cross-correlation values to determine a time lag for each CCVS 100 that produces a largest cross-correlation value.

Block 308 determines the average velocity vector at each CCVS 100 for the chemical or contaminant. This average velocity vector is drawn from each of the pairs of sensors 102 within the CCVS 100. Block 310 then averages the output of block 308 with previous average velocity vectors, producing a time-averaged velocity vector for each CCVS 100. Block 312 reverses each time-averaged velocity vector and finds a point or region of convergence, thereby identifying the source 202.

It should be noted that blocks 302-310 may be repeated until a convergence criterion is met. In some embodiments, the convergence criterion may include a distance between crossing points of the reversed time-averaged velocity vectors, which characterizes whether a distinct source 202 has been identified. In some embodiments, the convergence criterion may include a threshold of change, where successive average velocity vectors provide progressively less variation to the average—when new average velocity vectors change the average by an amount less than the threshold, the convergence point can be determined. It should be understood that these convergence criteria are not intended to be limiting, and that any appropriate convergence criterion or criteria may be used instead.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
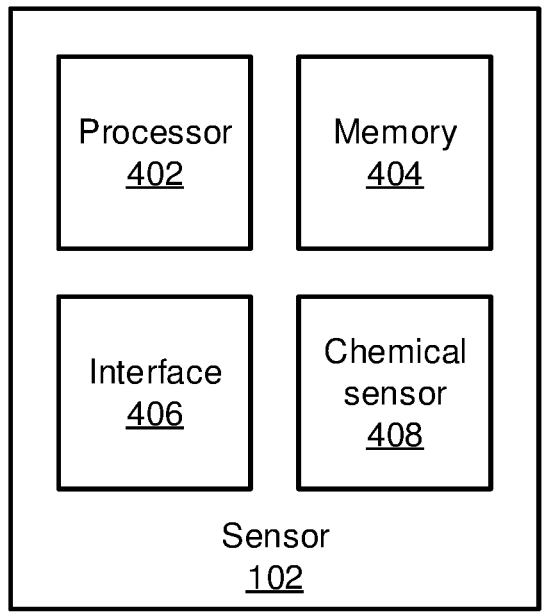
FIG. 4 is a block diagram of a sensor in accordance with an embodiment of the present invention.

Referring now to FIG. 4, additional detail on the sensors 102 is provided. Each sensor 102 includes a hardware processor 402 and a memory 404. A communications interface 406 provides communications to the control module 104 and optionally to the other sensors 102 via wired and/or wireless connections using any appropriate communications protocol.

The sensor 102 includes a chemical sensor 408. The chemical sensor 408 makes measurements of a concentration of one or more chemicals or contaminants. The communications interface 406 may communicate sensor measurements to the sensor control module 104 in real-time or may, alternatively, transmit measurements that have been taken by the sensor 408 at a previous date and stored in memory 404. The measurements may be made by any appropriate mechanism, including but not limited to a spectroscope, a chromatograph, an electrochemical cell, a pH sensor, etc.

Figure 5:
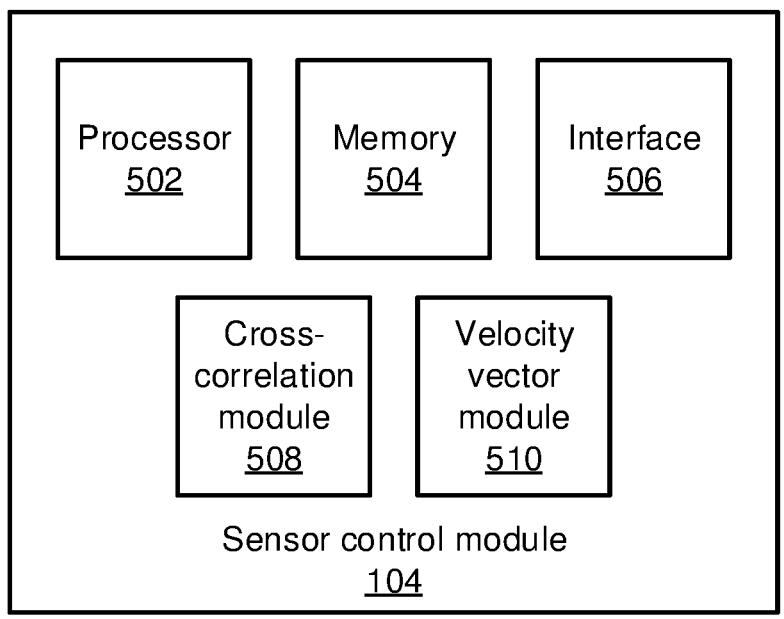
FIG. 5 is a block diagram of a sensor control module that measures a direction of chemical or contaminant flow in accordance with an embodiment of the present invention.

Referring now to FIG. 5, additional detail on the sensor control module 104 is shown. The sensor control module 104 includes a hardware processor 502, a memory 504, and a communications interface 506. The communications interface 506 provides communications between the sensor control module 104 and the sensors 102, collecting measurements from the sensors 102 for storage in memory 504. The communications interface 506 furthermore provides communications between sensor control modules 104 in respective CCVSs 100 as well as providing communications to a central analysis system 204. The sensor control module 104 includes one or more functional modules that may, in some embodiments, be implemented as software that is stored in memory 504 and executed by processor 502. In alternative embodiments, the functional modules may be implemented as one or more discrete hardware components in the form of, e.g., application-specific integrated chips or field programmable gate arrays.

A cross-correlation module 508 cross-correlates the time sequenced measurements of each pair of sensors 102 in the same CCVS 100 to identify a time lag that maximizes the cross-correlation value. Velocity vector module 510 then generates an average velocity vector as described above based on the sensor measurements. The velocity vector module 510 may furthermore average the new average velocity vector with previously measured average velocity vectors stored in memory 504.

Figure 6:
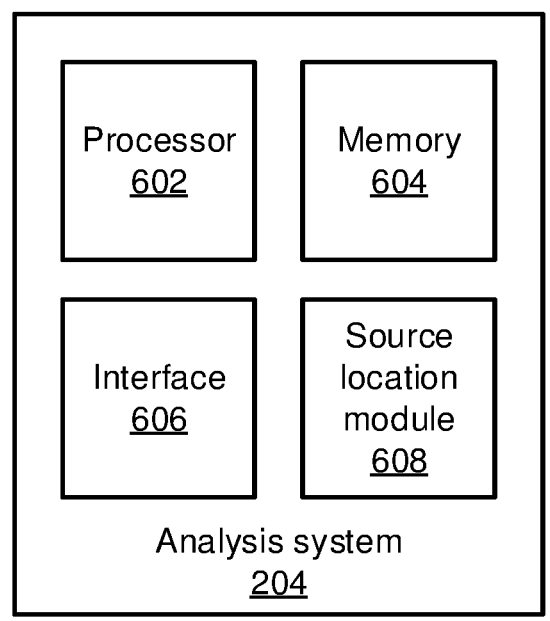
FIG. 6 is a block diagram of an analysis system that localizes the source of a chemical or contaminant in accordance with an embodiment of the present invention.

Referring now to FIG. 6, additional detail on the analysis system 204 is shown. The analysis system 204 includes a hardware processor 602 and memory 604, as well as a communications interface 606 that is configured to communicate with the sensor control modules 104 of the respective CCVSs 100. The communications interface 606 may communicate with the sensor control modules 104 by any appropriate wired or wireless connection using any appropriate protocol. The analysis system 204 further includes one or more functional modules that may, in some embodiments, be implemented as software that is stored in memory 604 and executed by processor 602. In alternative embodiments, the functional modules may be implemented as one or more discrete hardware components in the form of, e.g., application-specific integrated chips or field programmable gate arrays.

In particular, the analysis system 204 includes a source location module 608 that takes average velocity vector information from the respective sensor control modules 104 and reverse the various average velocity vectors to find a point of convergence. The source location module 608 therefore maintains in memory 604 the physical location of each CCVS 100 to provide physical coordinates and a degree of uncertainty for the source 202.

The analysis system 204 may be a separate component in the system, independently communicating with each of the CCVSs 100 as shown in FIG. 2. In other embodiments, however, the analysis system 204 may be integrated with one or more of the CCVSs 100.

Figure 7:
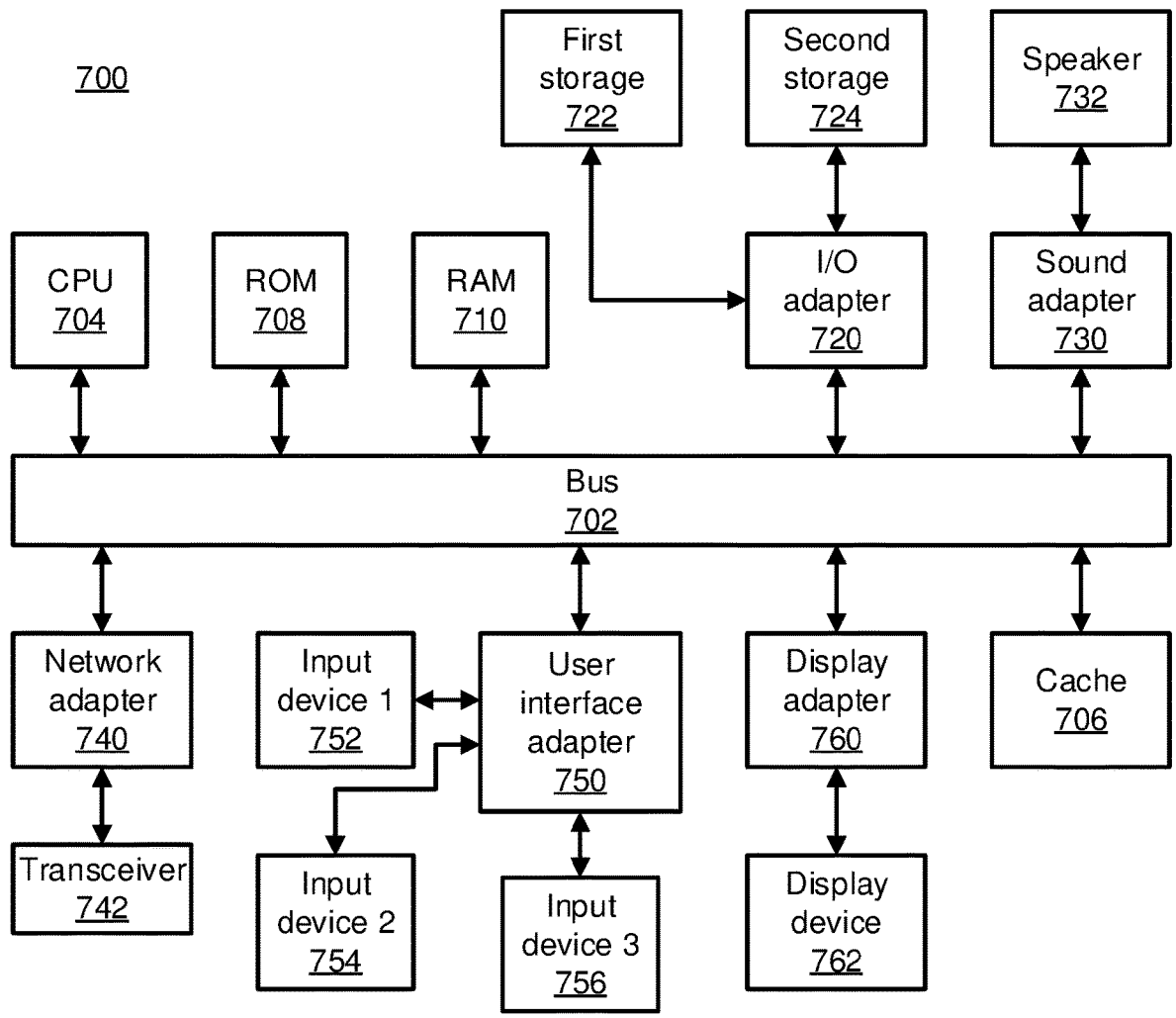
FIG. 7 is a block diagram of a processing system in accordance with an embodiment of the present invention.

Referring now to FIG. 7, an exemplary processing system 700 is shown which may represent the analysis system 204. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for locating a chemical source, comprising:
cross-correlating measured chemical concentration data from pairs of sensor positions using a processor to determine an average velocity vector for a group of sensor positions that averages away turbulence contributions; and
determining a convergence region based on a plurality of average velocity vectors to determine a chemical source location.

2. The method of claim 1, wherein determining the convergence region comprises reversing a direction of each of average velocity vector.

3. The method of claim 1, wherein cross-correlating chemical concentration data comprises integrating over a product of concentration values measured at a pair of sensor positions at times separated by a time lag to produce a cross-correlation product C.

4. The method of claim 3, wherein cross-correlating chemical concentration data further comprises determining a time lag that produces a maximum cross-correlation product.

5. The method of claim 4, wherein the cross-correlation product is calculated as:

$$C_{t_a,t_b}(\tau) = \int_{t_a}^{t_b} S_1(t) S_2(t-\tau) dt$$

where $t_a$ and $t_b$ are time limits, $S_1(t)$ and $S_2(t)$ are measurements from a first sensor and a second sensor at a time t, and $\tau$ is a time lag.

6. The method of claim 4, further comprising determining the average velocity vector based on a normalized sum of distances between each pair of sensor positions divided by a respective determined time lag for each pair of sensor positions.

7. The method of claim 1, wherein each group of sensor positions comprises at least four chemical concentration sensors at respective positions.

8. The method of claim 7, wherein cross-correlating chemical concentration data from pairs of sensor positions comprises determining respective average velocity vectors for a plurality of groups of sensor positions.

9. A combined chemical and velocity sensor system, comprising:
a sensor control module comprising a processor configured to cross-correlate measured chemical concentration data from pairs of chemical concentration sensor positions and to determine an average velocity vector for a group of sensor positions that averages away turbulence contributions to determine a chemical source location.

10. The system of claim 9, wherein the sensor control module is further configured to integrate over a product of concentration values measured at a pair of sensor positions at times separated by a time lag to produce a cross-correlation product C.

11. The system of claim 10, wherein the sensor control module is further configured to determine a time lag that produces a maximum cross-correlation product.

12. The system of claim 11, wherein the cross-correlation product is calculated as:

$$C_{t_a,t_b}(\tau)=\int_{t_a}^{t_b}S_1(t)S_2(t-\tau)dt$$

where $t_a$ and $t_b$ are time limits, $S_1(t)$ and $S_2(t)$ are measurements from a first sensor and a second sensor at a time t, and $\tau$ is a time lag.

13. The system of claim 11, wherein the sensor control module is further configured to determine the average velocity vector based on a normalized sum of distances between each pair of sensor positions divided by a respective determined time lag for each pair of sensor positions.

14. The system of claim 9, wherein the chemical concentration sensors comprise at least four chemical concentration sensors.

15. The system of claim 14, wherein the chemical concentration sensors are non-coplanar.

16. A chemical source location system, comprising:
a plurality of chemical and velocity sensor (CCVS) systems, each CCVS system comprising:
a sensor control module comprising a processor configured to cross-correlate measured chemical concentration data from pairs of chemical concentration sensor positions and to determine an average velocity vector for a group of sensor positions that averages away turbulence contributions; and
an analysis module comprising a processor configured to determine a convergence region based on the plurality of average velocity vectors to determine a chemical source location.

17. The system of claim 16, wherein the analysis module is further configured to reverse the direction of each average velocity vector to determine the convergence region.

18. The system of claim 16, wherein each CCVS system further comprises at least four chemical concentration sensors.

19. The system of claim 18, wherein the at least four chemical concentration sensors of each CCVS system are non-coplanar.

20. The system of claim 16, comprising at least four non-coplanar CCVS systems.

* * * * *